United States Patent [19]
Sax

[11] Patent Number: 5,259,142
[45] Date of Patent: Nov. 9, 1993

[54] PLANT IRRIGATION DEVICE

[76] Inventor: Stephen H. Sax, 2402 - 3rd St., Ste. 101, Santa Monica, Calif. 90405

[21] Appl. No.: 864,228

[22] Filed: Apr. 6, 1992

[51] Int. Cl.$^5$ .............................................. A01G 29/00
[52] U.S. Cl. ...................................... 47/48.5; 239/38; 47/79
[58] Field of Search ................... 47/48.5, 48.5 G, 79; 239/37, 38, 43, DIG. 23

[56] References Cited

U.S. PATENT DOCUMENTS

| | | | |
|---|---|---|---|
| 3,357,129 | 12/1967 | Torrence | 47/48.5 G |
| 4,089,133 | 5/1978 | Duncan | 47/48.5 G |
| 4,896,457 | 1/1990 | Pitcher | 47/82 |
| 4,970,823 | 11/1990 | Chen | 47/48.5 G |

FOREIGN PATENT DOCUMENTS

| | | | |
|---|---|---|---|
| 78064 | 2/1894 | Fed. Rep. of Germany | 47/48.5 G |
| 35824 | 1/1964 | Fed. Rep. of Germany | 47/48.5 G |
| 1104205 | 11/1955 | France | 47/48.5 G |
| 1217816 | 5/1960 | France | |
| 1058780 | 6/1959 | German Democratic Rep. | 47/48.5 G |

*Primary Examiner*—Henry E. Raduazo
*Attorney, Agent, or Firm*—Keith D. Beecher

[57] ABSTRACT

A plant irrigation device for a potted plant includes a hollow stake adapted to be inserted into the soil adjacent to the plant, and a bottle supported on the stake in an inverted position. The bottle is provided with a dispensing cap which has a spout extending down into the hollow stake, and which causes liquid contained in the bottle to drip down through the stake into the soil. A replaceable disc-shaped filter is mounted in the cap which filters sediment out of the liquid through the spout, and which serves to prevent clogging of the spout. The filter also acts as a restrictor which causes the liquid to drop slowly from the bottle as a function of the quantity of filter material in the cartridge.

4 Claims, 1 Drawing Sheet

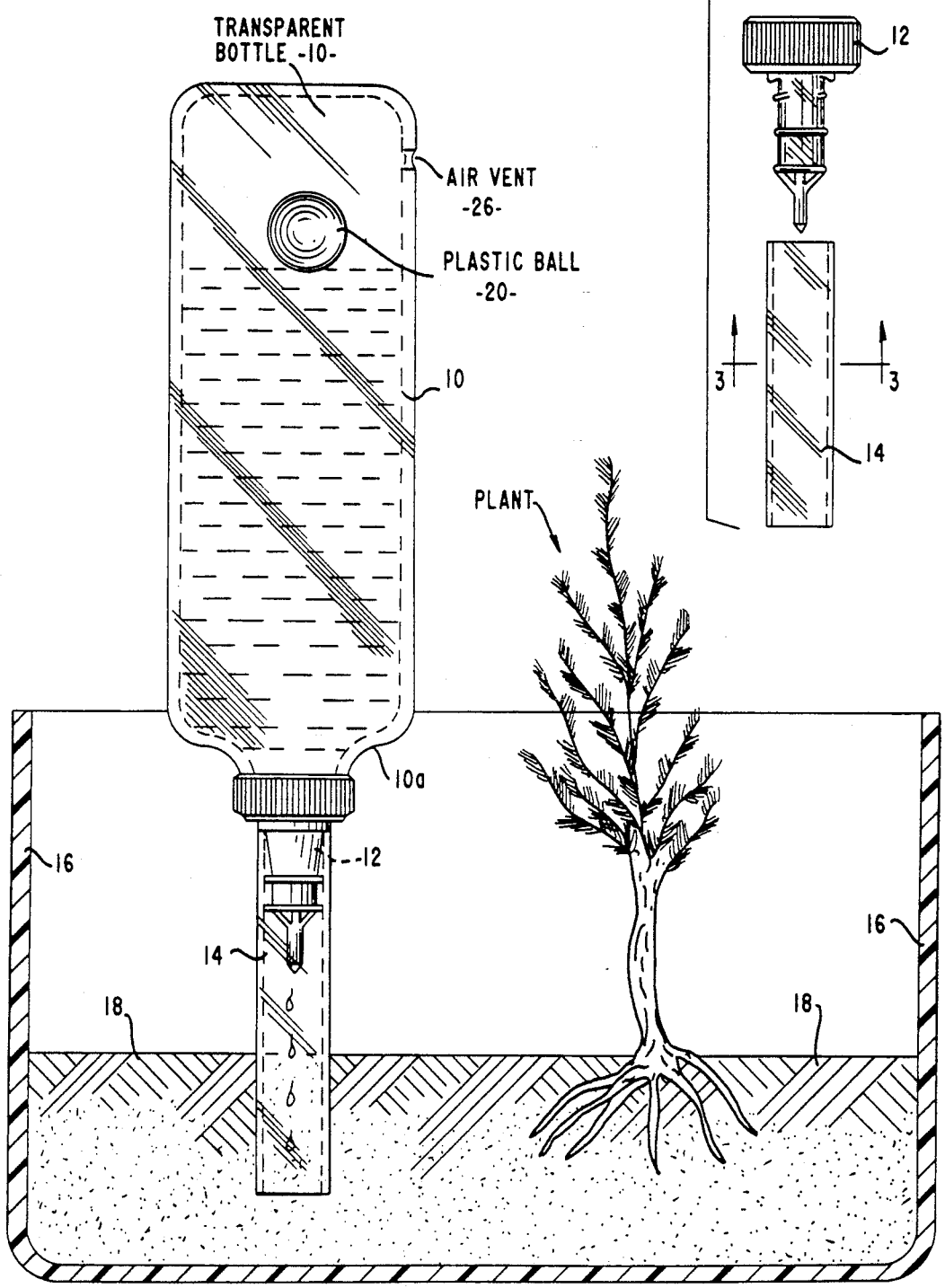

PLANT IRRIGATION DEVICE

BACKGROUND OF THE INVENTION

A plant irrigation device for a potted plant, which includes a hollow stake adapted to be inserted into the soil adjacent to the plant, and a bottle supported on the stake in an inverted position. The bottle is provided with a dispensing cap which has a spout extending down into the hollow stake, and which causes liquid contained in the bottle to drip down through the stake into the soil. A replaceable disc-shaped filter is mounted in the cap which filters sediment out of the liquid through the spout, and which serves to prevent clogging of the spout. The filter also acts as a restrictor which causes the liquid to drip slowly from the bottle.

RELATED CASES

Application Ser. No. 779,276 filed Sep. 23, 1985, in the name of the present inventor now abandoned.

BACKGROUND OF THE INVENTION

The proper irrigation of plants, and especially indoor potted plants, has long been a problem, particularly in situations where the plants must remain unattended for prolonged periods of time. Several devices have been suggested in the past in an attempt to solve this problem. For example, U.S. Pat. No. 2,595,782 illustrates and describes a device which is intended to be mounted in a flower pot, or other vessel, in order to supply water to the plant contained in the flower pot over an extended period of time. A somewhat more elaborate device is disclosed in U.S. Pat. No. 3,856,205, which responds to lack of moisture in the soil to initiate the watering operation. However, the prior art devices for the most part are complicated and expensive. Moreover, a problem has arisen with respect to the prior art devices, such as those described above, due to the fact that sediment in the water tends to clog the outlet rendering the device inoperative in a relatively short period of time.

An objective of the present invention is to provide a plant watering device of the type referred to above, in which the problem, of sediment in the water is overcome. This objective is realized in the embodiment of the invention to be described by the provision of a replaceable disc-shaped filter. The filter serves to remove the sediment from the liquid, and thereby serves to avoid clogging of the dispensing spout, and it also serves as a flow restrictor which regulates the drip of liquid from the device. The filter is inexpensive, and it may be periodically replaced.

BRIEF DESCRIPTION OF THE DRAWING

FIG. 1, is a side elevational view of one embodiment of the invention which includes a bottle and a dispensing cap, and which is supported by a hollow stake in the soil of a potted plant;

FIG. 2, is an exploded view showing the dispensing cape of FIG. 1, and is also showing a replaceable disc-shaped filter which is contained in the cap; and FIG. 3, is a cross-sectional view of the hollow stake.

DETAILED DESCRIPTION OF THE ILLUSTRATED EMBODIMENT

As shown in FIG. 1, a plant is planted in soil 18, or other growing medium, contained within a pot 16. The device of the present invention is intended to provide adequate watering and/or fertilizing for the plane on a prolonged, unattended basis.

The device illustrated in FIG. 1, includes a hollow stake 14 which may be composed of plastic, or other suitable material, and which is inserted into the soil 18, and which extends upwardly about ½" to 1" above the surface of the soil. The stake may have a square cross-section as showing in FIG. 3. A cylindrical-shaped bottle 10, which may contain water, and/or liquid fertilizer, is supported in an inverted position by the stake 14. The bottle 10 has a neck 10a, and a dispensing closure cap 12 is screwed to the neck. The cap 12 is removable so that the liquid within the bottle may be replenished. Cap 12 has a spout which extends into the hollow stake 14 so that the bottle may be supported by the stake, and so that the liquid within the bottle may be fed through the spout and through the stake on a drip-by-drip basis to the soil 18.

The bottle 10 may be transparent, so that the liquid level within the bottle may be readily observed. A brightly colored plastic ball 20 may be placed in the bottle, to float on the surface of the liquid and provide a readily observable indicator of the liquid level.

A vent 26 is provided adjacent to the bottom of the bottle. When the bottle is mounted in its inverted irrigating position of FIG. 1, the vent serves to avoid vacuum effects within the bottle which would otherwise impair the free-flow of liquid from the bottle.

Dispensing cap 12 may be generally similar to the dispensing closure cap described in Stull U.S. Pat. No. 3,406,880. However, other types of caps may be used. When a cap such as shown in the Stull patent is used, it is used without the twist open/closed section described in that patent.

As mentioned above, due to sediment in the water and/or liquid fertilizer, clogging of the spout of the dispensing cap has been a problem in the prior art devices. This problem is overcome in the device of the present invention by the provision of a thin disc-shaped filter 22 which is replaceable, and which fits down into the dispensing cap 12. The filter 22 may be formed of any appropriate porous plastic or other material. It is held in place by a gasket 24 which may take the form of a rubber washer. This filter 22, as mentioned above, serves to prevent clogging of the spout of dispensing cap 12, by sediment within the water and/or liquid fertilizer; and it also acts as a restrictor causing the liquid to drop slowly through the cap. The filter 22 is held firmly in place by gasket 24 when cap 12 is screwed onto the neck of bottle 10.

The dispensing cap 12 and filter 22 cause the liquid from the bottle to drip through the hollow stake 14 at an extremely slow rate. It has been found, for example, that a 16 ounce bottle contains sufficient liquid to provide adequate watering for the plant on an unattended basis for over two weeks, keeping the soil moist for an even longer period of time for the average size household plant. Filter 22 needs to be replaced normally no more frequently than after 3-6 two week waterings. It has been found that the filter performs efficiently to prevent any clogging of the spout by sediment contained in the water, and commercially available bottled water can be used successfully.

The plant watering device of the invention, as described above, is composed of a relatively few inexpensive and readily available components, so that it can be constructed at low cost, and sold at a relatively low price, Also, the device is simple to install, and easy to operate.

It will be appreciated that while a particular embodiment of the invention has been shown and described, modifications may be made. It is intended in the claims to cover all modifications which come within the true spirit and scope of the invention.

I claim:

1. A device for irrigating the soil of a plant over an extended period of time, said device including: a bottle having a neck of reduced diameter compared with the diameter of the bottle; a dispensing cap attached to the neck of the bottle and removable to permit the bottle to be filled with liquid, said dispensing cap having a spout; a hollow stake-like member adapted to be inserted into the soil in an upright position and serving to support the bottle in an inverted position above the surface of the soil with said spout extending into the top of the stake-like member and for causing liquid from the bottle to drip down through said stake-like member into the soil; a porous disc-shaped member of filtering material having a diameter corresponding to the reduced diameter of the neck removably mounted in said cap to form a wall between the neck and the cap and serving to remove sediment from the liquid and to prevent clogging and to restrict the flow of liquid through the cap.

2. The device defined in claim 1, in which said porous disc-shaped member is formed of a plastic material.

3. The device defined in claim 1, and which includes an annular gasket positioned in said cap between said porous disc-shaped member and the neck of the bottle and engaging the peripheral surface of said porous disc-shaped member.

4. The device defined in claim 2, in which said cap is threaded to the neck of the bottle.

* * * * *